United States Patent
Benning (10) Patent No.: US 10,048,288 B2
(45) Date of Patent: Aug. 14, 2018

(54) ANGLE OF ATTACK VANE WITH DIFFERENTIAL PRESSURE VALIDATION

(71) Applicant: Rosemount Aerospace Inc., Burnsville, MN (US)

(72) Inventor: Kevin Benning, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 322 days.

(21) Appl. No.: 14/991,583

(22) Filed: Jan. 8, 2016

(65) Prior Publication Data

US 2017/0199218 A1    Jul. 13, 2017

(51) Int. Cl.
  *G01P 21/00*    (2006.01)
  *G01P 13/02*    (2006.01)
  *G01P 21/02*    (2006.01)

(52) U.S. Cl.
  CPC ............ *G01P 21/00* (2013.01); *G01P 13/025* (2013.01); *G01P 21/025* (2013.01)

(58) Field of Classification Search
  CPC ......... G01P 21/00; G01P 13/02; G01P 13/025
  See application file for complete search history.

(56) References Cited

U.S. PATENT DOCUMENTS

| | | |
|---|---|---|
| 4,672,846 A | 6/1987 | LeBlond et al. |
| 5,257,536 A | 11/1993 | Beigbeder et al. |
| 6,941,805 B2 | 9/2005 | Seidel et al. |
| 7,401,507 B2 | 7/2008 | Collot et al. |

FOREIGN PATENT DOCUMENTS

GB    776486    6/1957

OTHER PUBLICATIONS

Extended European Search Report for European Patent Application No. 17150665.2, dated Mar. 7, 2017, 8 pages.

*Primary Examiner* — Robert R Raevis
(74) *Attorney, Agent, or Firm* — Kinney & Lange, P.A.

(57) ABSTRACT

An angle of attack sensing system includes a rotatable vane, a first pressure sensing port, a second pressure sensing port, a vane position sensor, and a fault detector. The rotatable vane includes a first surface and a second surface opposite the first surface. The first pressure sensing port is disposed in the first surface. The second pressure sensing port is disposed in the second surface. The vane position sensor is configured to output a rotational position signal of the rotatable vane. The fault detector is configured to output an indication of a rotational fault condition based on a difference between a first sensed pressure from the first pressure sensing port and a second sensed pressure from the second pressure sensing port.

20 Claims, 4 Drawing Sheets

ANGLE OF ATTACK VANE WITH DIFFERENTIAL PRESSURE VALIDATION

BACKGROUND

The present disclosure relates generally to angle of attack sensing systems, and more particularly to angle of attack sensing systems that utilize a rotatable vane.

Modern aircraft often incorporate air data systems that calculate air data outputs based on measured parameters collected from various sensors positioned about the aircraft. For instance, many modern aircraft utilize angle of attack sensors having a rotatable vane that is utilized to determine the aircraft angle of attack (i.e., an angle between oncoming airflow or relative wind and a reference line of the aircraft, such as a chord of a wing of the aircraft). The angle of attack sensor is mounted to the aircraft such that the rotatable vane is exposed to oncoming airflow about the aircraft exterior. Aerodynamic forces acting on the rotatable vane cause the vane to align with the direction of the oncoming airflow (i.e., along a chord extending from a leading edge to a trailing edge of the vane). Rotational position of the vane is sensed and utilized to determine the aircraft angle of attack. Accordingly, hindrance of the free rotation of the angle of attack vane (e.g., due to mechanical binding or other conditions) can degrade the accuracy of angle of attack determinations derived from the rotational position of the vane.

SUMMARY

In one example, an angle of attack sensing system includes a rotatable vane, a first pressure sensing port, a second pressure sensing port, a vane position sensor, and a fault detector. The rotatable vane includes a first surface and a second surface opposite the first surface. The first pressure sensing port is disposed in the first surface. The second pressure sensing port is disposed in the second surface. The vane position sensor is configured to output a rotational position signal of the rotatable vane. The fault detector is configured to output an indication of a rotational fault condition based on a difference between a first sensed pressure from the first pressure sensing port and a second sensed pressure from the second pressure sensing port.

In another example, a method includes generating a differential pressure signal indicative of a difference between a first sensed pressure from a first pressure sensing port disposed in a first surface of a rotatable angle of attack vane and a second sensed pressure from a second pressure sensing port disposed in a second surface of the rotatable angle of attack vane that is opposite the first surface. The method further includes outputting, by a fault detector executing on at least one processor of an angle of attack sensing system, an indication of a rotational fault condition in response to determining that the differential pressure signal exceeds a threshold deviation from a baseline pressure difference.

DETAILED DESCRIPTION

As described herein, an angle of attack sensing system includes a rotatable vane, a vane position sensor, and a fault detector. The vane includes first and second surfaces extending along a chord from a leading edge to a trailing edge of the vane. The vane is configured to freely rotate to align the chord of the vane with a direction of air flowing over the vane from the leading edge to the trailing edge. The vane position sensor outputs a rotational position signal of the vane for use in determining an angle of attack of, e.g., an aircraft to which the angle of attack sensing system is mounted. Pressure sensing ports disposed in each of the first and second surfaces communicate pressure of air moving over the vane to one or more pressure sensors (e.g., differential pressure sensor(s), absolute pressure sensor(s), or other pressure sensors).

The fault detector is configured to output an indication of a rotational fault condition based on a pressure difference between the pressure sensing ports, such as when the pressure difference exceeds a threshold deviation from a baseline pressure difference corresponding to alignment of the chord of the vane with the direction of the oncoming airflow. For instance, in certain examples, the baseline pressure difference between the pressure sensing ports can be approximately zero, indicating that the rotatable vane is aligned within the oncoming airflow. A sensed pressure difference that deviates from zero (e.g., by a threshold amount) can indicate that the vane is not able to freely rotate to align with the oncoming airflow, thereby indicating a rotational fault condition of the vane due to, e.g., mechanical binding or other conditions that can impede the free rotation of the vane. Accordingly, an angle of attack sensing system implementing techniques of this disclosure can identify and output an indication of the presence of a rotational fault condition of a rotatable angle of attack vane, thereby increasing operational awareness of system reliability and overall system safety.

Figure 1:
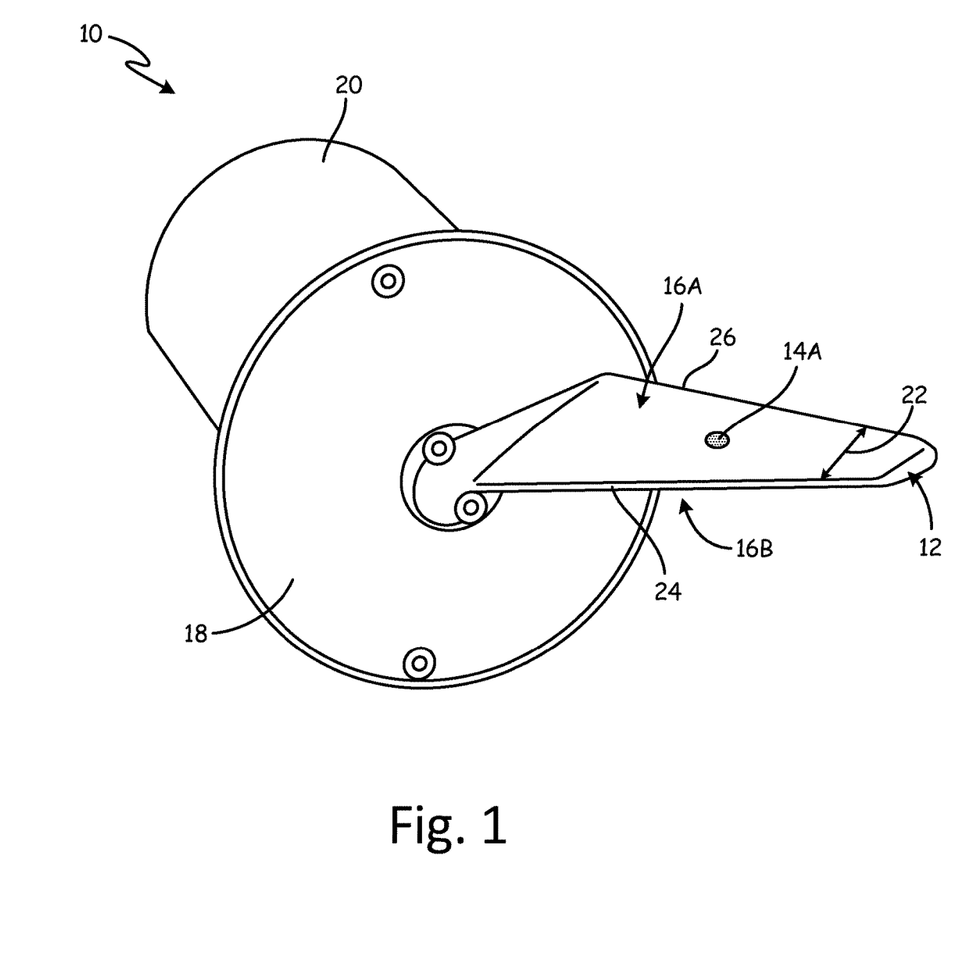
FIG. 1 is a perspective view of an angle of attack sensing system that includes a rotatable vane having a pressure sensing port disposed in each of a first and a second surface.

FIG. 1 is a perspective view of angle of attack sensing system 10 that includes rotatable vane 12 having pressure sensing port 14A disposed in first surface 16A and pressure sensing port 14B (visible in FIG. 3) disposed in second surface 16B. As illustrated in FIG. 1, angle of attack sensing system 10 further includes baseplate 18 and housing 20. Each of first surface 16A and second surface 16B extend along chord 22 that extends along a symmetrical center between first surface 16A and second surface 16B between leading edge 24 and trailing edge 26 of rotatable vane 12.

Baseplate 18 is configured to mount angle of attack sensing system 10 to an aircraft, such that housing 20 extends within an interior of the aircraft and rotatable vane 12 extends outside the exterior of the aircraft and is exposed to airflow about the aircraft exterior. Rotatable vane 12 is configured to freely rotate with a shaft (not illustrated in FIG. 1) extending axially within housing 20, as is further described below.

In operation, as air flows over rotatable vane 12 in a direction from leading edge 24 to trailing edge 26 (e.g., corresponding to forward flight of an aircraft), rotatable vane 12 rotates such that pressure differences between the air flowing over first surface 16A and second surface 16B equalize and chord 22 aligns with the direction of the oncoming airflow. Pressures acting on each of first surface 16A and second surface 16B are conveyed via pressure sensing ports 14A and 14B, respectively. The air pressures conveyed via pressure sensing ports 14A and 14B are communicated to one or more pressure sensors that measure the pressure (e.g., static pressure) at the location of pressure sensing ports 14A and 14B. A fault detector is configured to output an indication of a rotational fault condition based on a difference between the sensed pressures from pressure sensing ports 14A and 14B, such as by outputting an indication of a rotational fault condition in response to determining that the pressure difference between the sensed pressures exceeds a threshold deviation from a baseline pressure difference corresponding to alignment of chord 22 with the direction of the oncoming airflow, as is further described below. As such, angle of attack sensing system 10 implementing techniques described herein can identify and output an indication of a rotational fault condition of rotatable vane 12 due to, e.g., mechanical binding or other condition that can possibly hinder (or prevent) the free rotation of rotatable vane 12 to align with the direction of oncoming airflow. Accordingly, techniques of this disclosure can increase operational awareness of the reliability of angle of attack determinations derived from angle of attack sensing system 10.

Figure 2:
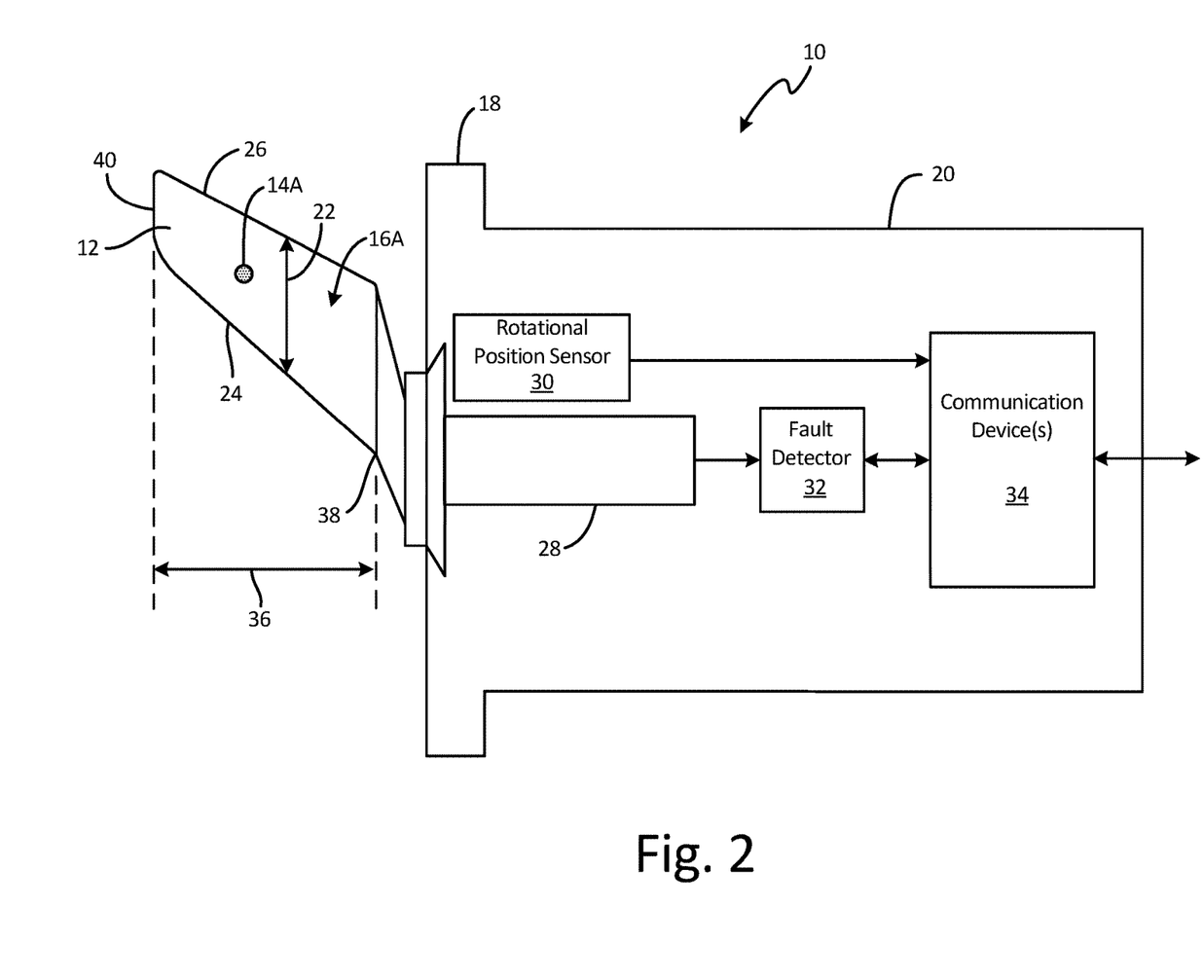
FIG. 2 is a schematic diagram of an angle of attack sensing system that includes a rotatable vane having a pressure sensing port disposed in each of a first and a second surface.

FIG. 2 is a schematic diagram of angle of attack sensing system 10 that includes rotatable vane 12 and showing pressure sensing port 14A disposed in first surface 16A. As illustrated in FIG. 2, angle of attack sensing system 10 further includes shaft 28, rotational position sensor 30, fault detector 32, and communication device(s) 34.

First surface 16A extends along chord 22 from leading edge 24 to trailing edge 26 and along span 36 from root 38 to tip 40 of rotatable vane 12. Pressure sensing port 14A is disposed in first surface 16A. Though illustrated as a circular port in the example of FIG. 2, pressure sensing port 14A need not be circular in every example. For instance, pressure sensing port 14A can have an elliptical shape, a teardrop shape, or other shape. In general, pressure sensing port 14A can be defined by any boundary of opening within first surface 16A that enables pressures resulting from air flowing over first surface 16A to be pneumatically connected to a pressure sensor that measures the conveyed pressure. In addition, while not visible in the example of FIG. 2, it should be understood that second surface 16B (of FIGS. 1 and 3) includes pressure sensing port 14B (illustrated in FIG. 3) that can be substantially similar to pressure sensing port 14A.

Pressure sensing ports 14A and 14B, in some examples, can be disposed within first surface 16A and second surface 16B, respectively, at a same position along chord 22 and at a same position along span 36. For instance, pressure sensing port 14A can be disposed at a location of first surface 16A that is a first span length from root 38 and a first chord distance from leading edge 24. Pressure sensing port 14B can be disposed at a location of second surface 16B that is the first span length from root 38 and the first chord distance from leading edge 24. In other examples, pressure sensing ports 14A and 14B can be disposed within first surface 16A and second surface 16B, respectively, each at different positions along chord 22 and/or span 36.

Housing 20 extends axially from baseplate 18 and encloses shaft 28, rotational position sensor 30, fault detector 32, and communication device 34. Shaft 28 extends axially from rotatable vane 12 within housing 20. Shaft 28 is connected to rotatable vane 12 such that rotation of rotatable vane 12 causes corresponding rotation of shaft 28. Rotational position sensor 30 can be a resolver, encoder, or other type of sensor that can sense relative (i.e., incremental) and/or absolute angular position of shaft 28.

Angle of attack sensing system 10 can utilize communication device(s) 34 to communicate with external devices via one or more wired or wireless communication networks, or both. For example, communication device(s) 34 can be a network interface card (or equivalent discrete or integrated circuitry) configured to send and receive data over a communications network and/or data bus according to one or more communications protocols, such as the Aeronautical Radio, Incorporated (ARINC) 429 communication protocol, controller area network (CAN) bus communication protocol, or other communication protocols. Other examples of communication device(s) 34 can include, e.g., an Ethernet card, an optical transceiver, a radio frequency transceiver, or any other type of device that can send and receive data via wired and/or wireless communications.

Fault detector 32, in some examples, includes one or more processors and computer-readable memory encoded with instructions that, when executed by the one or more processors, cause fault detector 32 to operate in accordance with techniques described herein. Examples of one or more processors can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory of fault detector 32 can be configured to store information within fault detector 32 during operation. Computer-readable memory, in some examples, is described as a computer-readable storage medium. In certain examples, a computer-readable storage medium can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory can include volatile memory, non-volatile memory, or both. Examples of volatile memories can include random access memories (RAM), dynamic random access memories (DRAM), static random access memories (SRAM), and other forms of volatile memories. Examples of non-volatile memories can include flash memories, forms of electrically programmable memories (EPROM) or electrically erasable and programmable (EEPROM) memories, magnetic hard discs, optical discs, floppy discs, or other forms of non-volatile memories.

As illustrated in FIG. 2, rotational position sensor 30 and fault detector 32 can be electrically and/or communicatively coupled with communication devices 34 to send and/or receive data with one or more devices external to housing 20. In addition, fault detector 32 can be electrically, pneumatically, and/or communicatively coupled to receive an indication of one or more pressures sensed via pressure sensing ports 14A and 14B, as is further described below.

In operation, air flowing over rotatable vane 12 in a direction from leading edge 24 to trailing edge 26 acts on first surface 14A and second surface 14B to cause rotatable vane 12 to rotate such that pressures experienced by first surface 14A and second surface 14B equalize and chord 22 aligns with a direction of the oncoming airflow. Rotation of rotatable vane 12 causes corresponding rotation of shaft 28. Rotational position sensor 30 measures the rotational position (e.g., relative and/or absolute rotational position) of shaft 28 and communicates the measured position signal to an external device, such as an air data computer, via communication device(s) 34. Fault detector 32 receives an indication of pressures sensed via pressure sensing ports 14A and 14B and determines, based on a difference between the sensed pressures, whether a rotational fault condition of rotatable vane 12 is present, as is further described below. Accordingly, air data sensing system 10, implementing techniques of this disclosure, can identify and output an indication of a rotational fault condition that corresponds to a hindrance of free rotation of rotatable vane 12.

Figure 3:
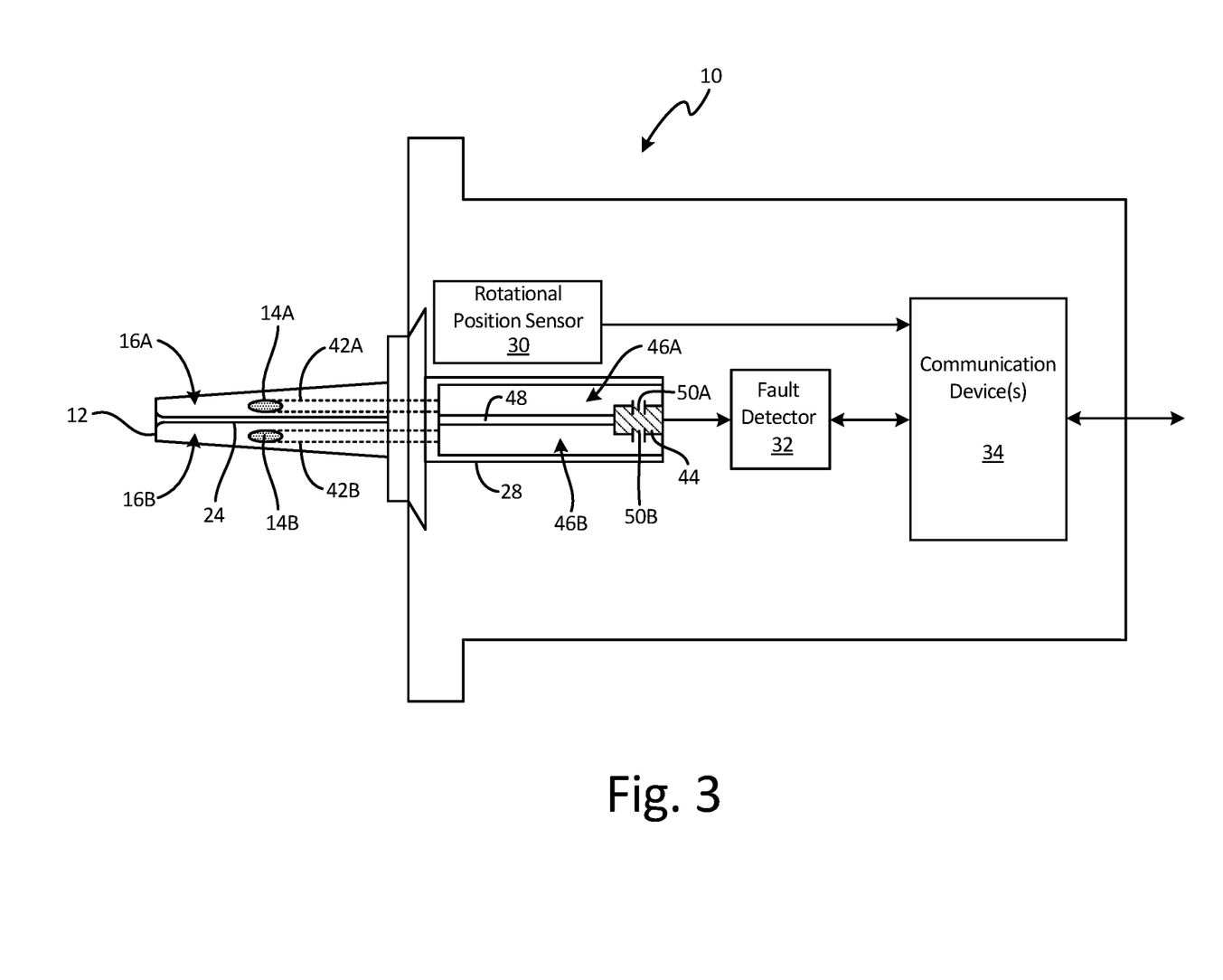
FIG. 3 is a schematic diagram of an angle of attack sensing system that includes a rotatable vane having a pressure sensing port disposed in each of a first and a second surface.

FIG. 3 is a schematic diagram of angle of attack sensing system 10 that includes rotatable vane 12 and showing a cutaway view of the interior of shaft 28. In the diagram of FIG. 3, rotatable vane 12 is oriented to show a front view along leading edge 24. As illustrated in FIG. 3, air data sensing system 10 further includes pneumatic conveying line 42A, pneumatic conveying line 42B, and differential pressure sensor 44. Shaft 28 further includes pressure chamber 46A, pressure chamber 46B, and isolation wall 48. Differential pressure sensor 44 includes input port 50A and input port 50B.

As illustrated in FIG. 3, pneumatic conveying line 42A extends from pressure sensing port 14A through an interior of rotatable vane 12 to pneumatically connect pressure sensing port 14A and pressure chamber 46A. Pneumatic conveying line 42B extends from pressure sensing port 14B through an interior of rotatable vane 12 to pneumatically connect pressure sensing port 14B and pressure chamber 46B. Pneumatic conveying lines 42A and 42B can be, in certain examples, bores or channels integrally formed within rotatable vane 12. In other examples, pneumatic conveying lines 42A and 42B can be pneumatic tubes that extend between pressure sensing ports 14A and 14B and pressure chambers 46A and 46B, respectively. In general, pneumatic conveying lines 42A and 42B can take the form of any pneumatic connection capable of conveying an airflow from pressure sensing ports 14A and 14B to differential pressure sensor 44 via, e.g., pressure chamber 46A and pressure chamber 46B.

Pressure chamber 46A and pressure chamber 46B can be formed as voids within shaft 28. Pressure chamber 46A is pneumatically isolated from pressure chamber 46B by isolation wall 48. Differential pressure sensor 44 includes input port 50A that is directly exposed to an interior of pressure chamber 46A. Input port 50B of differential pressure sensor 44 is directly exposed to an interior of pressure chamber 46B. As such, pneumatic conveying line 42A, connecting to pressure chamber 46A, can be considered a first pneumatic connection between pressure sensing port 14A and differential pressure sensor 44. Pneumatic conveying line 42B, connecting to pressure chamber 46B, can be considered a second pneumatic connection between pressure sensing port 14B and differential pressure sensor 44 that is pneumatically isolated from the first pneumatic connection.

Differential pressure sensor 44 can be a differential pressure transducer or other pressure sensor configured to measure a difference in pressures received at input ports 50A and 50B. Differential pressure sensor 44, as illustrated in FIG. 3, can be integrally formed with isolation wall 48, thereby exposing input port 50A to pressure chamber 46A and exposing input port 50B to pressure chamber 46B while maintaining the pneumatic isolation between pressure chambers 46A and 46B. In other examples, differential pressure sensor 44 can be external to shaft 28. In such examples input ports 50A and 50B can be pneumatically connected to pressure chambers 46A and 46B via separate pneumatic conveying lines. In some examples, differential pressure sensor 44 can be mounted on shaft 28 (e.g., mounted to an interior of shaft 28, mounted to an exterior of shaft 28, or otherwise mounted on shaft 28). In certain examples, shaft 28 need not include pressure chambers 46A and 46B. Rather, in such examples, input ports 50A and 50B of differential pressure sensor 44 can be directly connected to pneumatic conveying lines 42A and 42B, respectively. In certain examples, rather than include differential pressure sensor 44, angle of attack sensing system can include multiple (e.g., two) separate pressure sensors, each directly connected to one of conveying lines 42A and 42B or pressure chambers 46A and 46B. In such examples, fault detector 32 can determine a difference between pressures sensed via pressure sensing ports 14A and 14B by comparing (e.g., subtracting) the separately sensed pressures. In certain examples, differential pressure sensor 44 (or multiple absolute pressure sensors) can be disposed within rotatable vane 12. In such examples, electrical connections can extend from the pressure sensor(s) to fault detector 32 through rotatable vane 12 to fault detector 32 (e.g., through shaft 28 or external to shaft 28).

In the example of FIG. 3, differential pressure sensor 44 is electrically connected to fault detector 32. Fault detector 32 receives a differential pressure signal from differential pressure sensor 44 that is indicative of a difference between a pressure sensed from pressure sensing port 14A and a pressure sensed from pressure sensing port 14B.

In operation, fault detector 32 is configured to output an indication of a rotational fault condition based on the differential pressure signal received from differential pressure sensor 44. For instance, fault detector 32 can compare the received differential pressure signal to a baseline differential pressure value that corresponds to alignment of chord 22 of rotatable vane 12 with air flowing over rotatable vane 12 in a direction from leading edge 24 to trailing edge 26. In some examples, such as when pressure sensing ports 14A and 14B are symmetrically disposed about leading edge 24, the baseline differential pressure value can be zero. In other examples, such as when pressure sensing ports 14A and 14B are not symmetrically disposed about leading edge 24, the baseline differential pressure value can be a non-zero value (e.g., one millibar, two millibars, or other non-zero pressure values). Fault detector 32 can compare the differential pressure signal received from differential pressure sensor 44 to the baseline differential pressure value, and can determine that a rotational fault condition is present in response to determining that the received differential pressure signal exceeds a threshold deviation from the baseline differential pressure (e.g., one millibar deviation, two millibars deviation, or other threshold deviations). In certain examples, fault detector 32 can determine that a rotational fault condition is present in response to determining that the received differential pressure signal exceeds the threshold deviation from the baseline differential pressure for a threshold period of time, such as one second, two seconds, or other periods of time.

Fault detector 32 can output an indication of the rotational fault condition via communication device(s) 34. As such, fault detector 32 can effectively notify consuming systems, such as an air data computer or other consuming system, of the presence of a rotational fault condition of rotatable vane 12.

Figure 4:
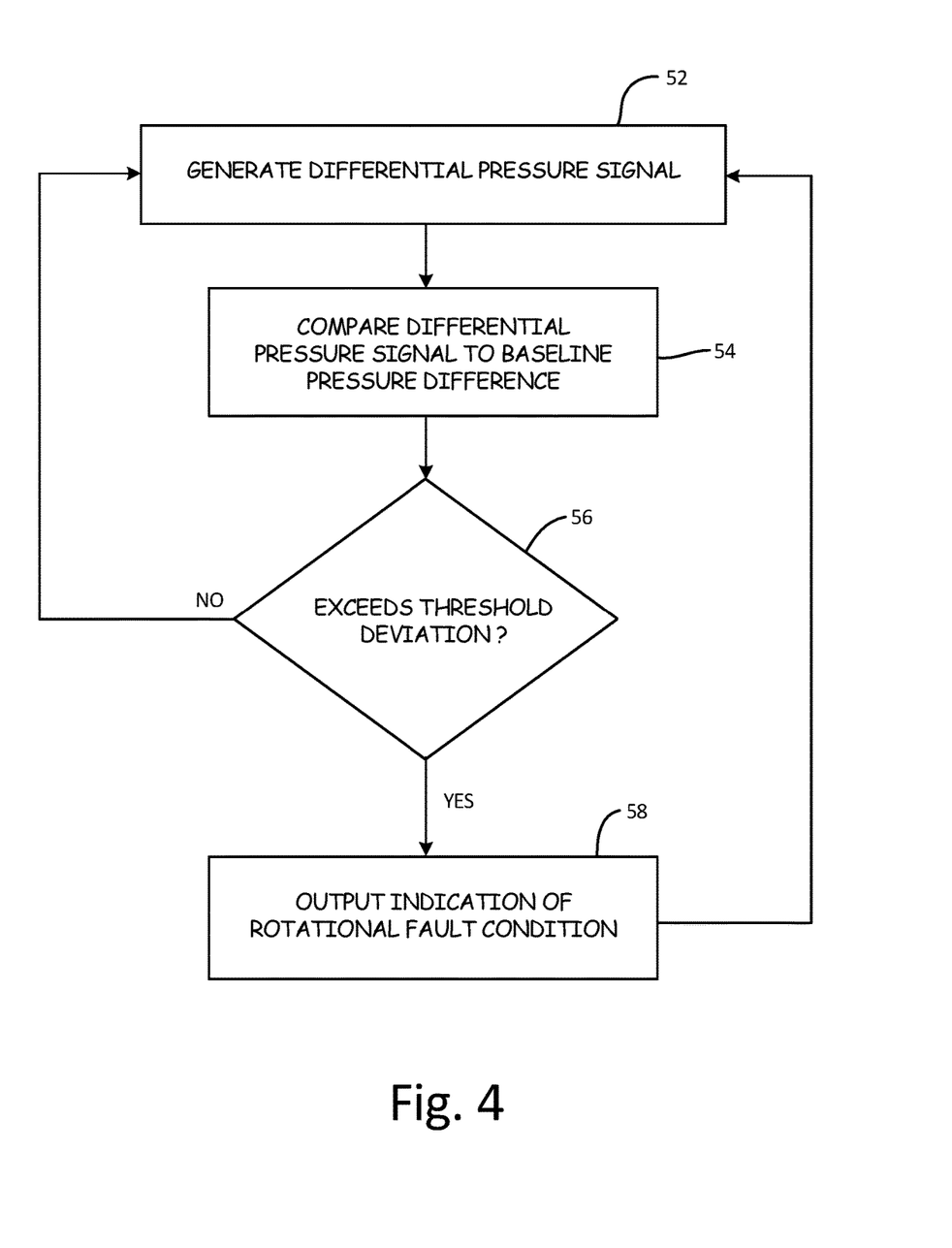
FIG. 4 is a flow diagram illustrating operations to output an indication of a rotational fault condition of a rotatable angle of attack vane.

FIG. 4 is a flow diagram illustrating example operations to output an indication of a rotational fault condition of a rotatable angle of attack vane. For purposes of clarity and ease of discussion, the example operations are described below within the context of angle of attack sensing system 10 of FIGS. 1-3.

A differential pressure signal indicative of a difference between a first sensed pressure from a first pressure sensing port disposed in a first surface of a rotatable angle of attack vane and a second sensed pressure from a second pressure sensing port disposed in a second surface of the rotatable angle of attack vane that is opposite the first surface can be generated (Step 52). For example, differential pressure sensor 44 can receive a first pressure from pressure sensing port 14A (e.g., via conveying line 42A and pressure chamber 46A) at input port 50A. Differential pressure sensor 44 can receive a second pressure from pressure sensing port 14B (e.g., via conveying line 42B and pressure chamber 46B) at input port 50B. Differential pressure sensor 44 can generate the differential pressure signal output as the difference between the first pressure received at input port 50A and the second pressure received at input port 50B. In other examples, the first pressure (e.g., from pressure sensing port 14A) can be received by a first pressure sensor that measures the first pressure. The second pressure (e.g., from pressure sensing port 14B) can be received by a second pressure sensor that measures the second pressure. Fault detector 32 can receive an indication of the first and second measured pressures from the first and second pressure sensors, and can generate the differential pressure signal by comparing the first and second measured pressures (e.g., subtracting the first measured pressure from the second measured pressure, or vice versa).

The differential pressure signal can be compared to a baseline pressure difference corresponding to alignment of the rotatable angle of attack vane with a direction of air flowing over the rotatable angle of attack vane in a direction from a leading edge to a trailing edge of the rotatable angle of attack vane (Step 54). For instance, fault detector 32 can compare the differential pressure signal (e.g., received from differential pressure sensor 44) to a baseline pressure difference that corresponds to alignment of chord 22 of rotatable vane 12 with a direction of oncoming airflow.

It can be determined whether the differential pressure signal exceeds a threshold deviation from the baseline pressure difference corresponding to alignment of the rotatable angle of attack vane with the direction of air flowing over the rotatable angle of attack vane in the direction from the leading edge to the trailing edge of the rotatable angle of attack vane (Step 56). For example, fault detector 32 can determine whether the differential pressure signal exceeds a threshold deviation, such as one millibar, two millibars, or other threshold deviations from the baseline pressure difference, and can identify the presence of a rotational fault condition in response to determining that the differential pressure signal exceeds the threshold deviation. In certain examples, fault detector 32 can determine whether the differential pressure signal exceeds the threshold deviation for a threshold period of time (e.g., one second, two seconds, or other periods of time), and can identify the presence of the rotational fault condition in response to determining that the differential pressure signal exceeds the threshold deviation for the threshold period of time.

In examples where it is determined that the differential pressure signal does not exceed the threshold deviation ("NO" branch of Step 56), the differential pressure signal can be generated (Step 52). In examples where it is determined that the differential pressure signal exceeds the threshold deviation ("YES" branch of Step 56), an indication of a rotational fault condition can be output (Step 58), and the differential pressure signal can continue to be generated (Step 52). For example, fault detector 32 can output an indication of a rotational fault condition of rotatable vane 12 via communication device(s) 34.

Accordingly, angle of attack sensing system 10, implementing techniques of this disclosure, can identify and output an indication of the presence of a rotational fault condition of rotatable angle of attack vane 12, thereby increasing operational awareness of system reliability and overall system safety.

The following are non-exclusive descriptions of possible embodiments of the present invention.

An angle of attack sensing system includes a rotatable vane, a first pressure sensing port, a second pressure sensing port, a vane position sensor, and a fault detector. The rotatable vane includes a first surface and a second surface opposite the first surface. The first pressure sensing port is disposed in the first surface. The second pressure sensing port is disposed in the second surface. The vane position sensor is configured to output a rotational position signal of the rotatable vane. The fault detector is configured to output an indication of a rotational fault condition based on a difference between a first sensed pressure from the first pressure sensing port and a second sensed pressure from the second pressure sensing port.

The angle of attack sensing system of the preceding paragraph can optionally include, additionally and/or alternatively, any one or more of the following features, configurations, operations, and/or additional components.

The rotatable vane can further include a leading edge, a trailing edge opposite the leading edge, a root, and a tip opposite the root. Each of the first and second surfaces can extend along a chord of the rotatable vane from the leading edge to the trailing edge and along a span of the rotatable vane from the root to the tip. The rotatable vane can be configured to freely rotate to align the chord of the rotatable vane with a direction of air flowing over the rotatable vane in a direction from the leading edge to the trailing edge.

The fault detector can be configured to output the indication of the rotational fault condition in response to determining that the difference between the first sensed pressure and the second sensed pressure exceeds a threshold deviation from a baseline pressure difference.

The baseline pressure difference can correspond to alignment of the chord of the rotatable vane with the direction of the air flowing over the rotatable vane in the direction from the leading edge to the trailing edge.

The first pressure sensing port can be disposed at a first location in the first surface that is a span length from the root and a chord distance from the leading edge. The second pressure sensing port can be disposed at a second location in the second surface that is the span length from the root and the chord distance from the leading edge.

The first and second surfaces can be symmetric about the leading edge.

The angle of attack sensing system can further include at least one pressure sensor, a first pneumatic connection between the first pressure sensing port and the at least one pressure sensor, and a second pneumatic connection between the second pressure sensing port and the at least one pressure sensor. The first pneumatic connection can be pneumatically isolated from the second pneumatic connection.

The angle of attack sensing system can further include a rotatable shaft extending axially from the rotatable vane. The vane position sensor can be disposed proximate the rotatable shaft and configured to sense a rotational position of the rotatable shaft and output the rotational position signal of the rotatable vane based on the sensed rotational position of the rotatable shaft. The first pneumatic connection can include a first pressure chamber disposed within the rotatable shaft. The second pneumatic connection can include a second pressure chamber disposed within the rotatable shaft.

The at least one pressure sensor can include a differential pressure sensor configured to measure the difference between the first sensed pressure and the second sensed pressure. The differential pressure sensor can have a first pressure input port pneumatically connected to the first pressure chamber and a second pressure input port pneumatically connected to the second pressure chamber.

The differential pressure sensor can be mounted on the rotatable shaft.

The first pressure input port can be directly exposed to an interior of the first pressure chamber. The second pressure input port can be directly exposed to an interior of the second pressure chamber.

The at least one pressure sensor can include a differential pressure sensor configured to measure the difference between the first sensed pressure from the first pressure sensing port and the second sensed pressure from the second pressure sensing port.

The at least one pressure sensor can include a first pressure sensor and a second pressure sensor. The first pneumatic sensor can be pneumatically connected to the first pressure sensing port via the first pneumatic connection and can be configured to sense the first sensed pressure. The second pneumatic sensor can be pneumatically connected to the second pressure sensing port via the second pneumatic connection and can be configured to sense the second sensed pressure.

The angle of attack sensing system can further include a base plate configured to mount the rotatable vane to an exterior of an aircraft, a housing extending from the base plate opposite the rotatable vane and configured to extend within an interior of the aircraft, and processing circuitry and computer-readable memory mounted within the housing. The fault detector can include instructions encoded on the computer-readable memory that, when executed by the processing circuitry, cause the fault detector to output the indication of the rotational fault condition based on the difference between the first sensed pressure from the first pressure sensing port and the second sensed pressure from the second pressure sensing port.

A method includes generating a differential pressure signal indicative of a difference between a first sensed pressure from a first pressure sensing port disposed in a first surface of a rotatable angle of attack vane and a second sensed pressure from a second pressure sensing port disposed in a second surface of the rotatable angle of attack vane that is opposite the first surface. The method further includes outputting, by a fault detector executing on at least one processor of an angle of attack sensing system, an indication of a rotational fault condition in response to determining that the differential pressure signal exceeds a threshold deviation from a baseline pressure difference.

The method of the preceding paragraph can optionally include, additionally and/or alternatively, any one or more of the following features, configurations, operations, and/or additional components.

Generating the differential pressure signal can include measuring, by a differential pressure sensor, the difference between the first sensed pressure and the second sensed pressure.

Measuring, by the differential pressure sensor, the difference between the first sensed pressure and the second sensed pressure can include receiving the first sensed pressure at a first input port of the differential pressure sensor that is directly exposed to a first pressure chamber within a shaft of the rotatable vane and receiving the second sensed pressure at a second input port of the differential pressure sensor that is directly exposed to a second pressure chamber within the shaft of the rotatable vane.

Generating the differential pressure signal can include measuring, by a first pressure sensor, the first sensed pressure from the first pressure sensing port, measuring, by a second pressure sensor, the second sensed pressure from the second pressure sensing port, and generating the differential pressure signal as a difference between the first sensed pressure and the second sensed pressure.

The baseline pressure difference can correspond to alignment of the rotatable angle of attack vane with a direction of air flowing over the rotatable angle of attack vane in a direction from a leading edge to a trailing edge of the rotatable angle of attack vane.

The rotatable angle of attack vane can be configured to freely rotate to align with a direction of air flowing over the rotatable angle of attack vane in a direction from a leading edge to a trailing edge.

Outputting the indication of the rotational fault condition can include outputting the indication of the rotational fault condition in response to determining that the differential pressure signal exceeds the threshold deviation from the baseline pressure difference for a threshold period of time.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle of attack sensing system comprising:
   a rotatable vane comprising a first surface and a second surface opposite the first surface;
   a first pressure sensing port disposed in the first surface;
   a second pressure sensing port disposed in the second surface;
   a vane position sensor configured to output a rotational position signal of the rotatable vane; and
   a fault detector configured to output an indication of a rotational fault condition based on a difference between a first sensed pressure from the first pressure sensing port and a second sensed pressure from the second pressure sensing port;
   wherein the fault detector is configured to output the indication of the rotational fault condition in response to determining that the difference between the first sensed pressure and the second sensed pressure exceeds a threshold deviation from a baseline pressure difference.

2. The angle of attack sensing system of claim 1,
   wherein the rotatable vane further comprises:
   a leading edge:
   a trailing edge opposite the leading edge;
   a root; and
   a tip opposite the root;

wherein each of the first and second surfaces extends along a chord of the rotatable vane from the leading edge to the trailing edge and along a span of the rotatable vane from the root to the tip; and wherein the rotatable vane is configured to freely rotate to align the chord of the rotatable vane with a direction of air flowing over the rotatable vane in a direction from the leading edge to the trailing edge.

3. The angle of attack sensing system of claim 2, wherein the first pressure sensing port is disposed at a first location in the first surface that is a span length from the root and a chord distance from the leading edge; and wherein the second pressure sensing port is disposed at a second location in the second surface that is the span length from the root and the chord distance from the leading edge.

4. The angle of attack sensing system of claim 2, wherein the first and second surfaces are symmetric about the leading edge.

5. The angle of attack sensing system of claim 1, wherein the baseline pressure difference corresponds to alignment of the chord of the rotatable vane with the direction of the air flowing over the rotatable vane in the direction from the leading edge to the trailing edge.

6. The angle of attack sensing system of claim 1, further comprising:

at least one pressure sensor;

a first pneumatic connection between the first pressure sensing port and the at least one pressure sensor; and a second pneumatic connection between the second pressure sensing port and the at least one pressure sensor;

wherein the first pneumatic connection is pneumatically isolated from the second pneumatic connection.

7. The angle of attack sensing system of claim 6, further comprising:

a rotatable shaft extending axially from the rotatable vane;

wherein the vane position sensor is disposed proximate the rotatable shaft and configured to sense a rotational position of the rotatable shaft and output the rotational position signal of the rotatable vane based on the sensed rotational position of the rotatable shaft;

wherein the first pneumatic connection comprises a first pressure chamber disposed within the rotatable shaft; and wherein the second pneumatic connection comprises a second pressure chamber disposed within the rotatable shaft.

8. The angle of attack sensing system of claim 7, wherein the at least one pressure sensor comprises a differential pressure sensor configured to measure the difference between the first sensed pressure and the second sensed pressure, the differential pressure sensor having a first pressure input port pneumatically connected to the first pressure chamber and a second pressure input port pneumatically connected to the second pressure chamber.

9. The angle of attack sensing system of claim 8, wherein the differential pressure sensor is mounted on the rotatable shaft.

10. The angle of attack sensing system of claim 9, wherein the first pressure input port is directly exposed to an interior of the first pressure chamber; and wherein the second pressure input port is directly exposed to an interior of the second pressure chamber.

11. The angle of attack sensing system of claim 6, wherein the at least one pressure sensor comprises a differential pressure sensor configured to measure the difference between the first sensed pressure from the first pressure sensing port and the second sensed pressure from the second pressure sensing port.

12. The angle of attack sensing system of claim 6, wherein the at least one pressure sensor comprises a first pressure sensor and a second pressure sensor;

wherein the first pneumatic sensor is pneumatically connected to the first pressure sensing port via the first pneumatic connection and is configured to sense the first sensed pressure; and wherein the second pneumatic sensor is pneumatically connected to the second pressure sensing port via the second pneumatic connection and is configured to sense the second sensed pressure.

13. The angle of attack sensing system of claim 1, further comprising:

a base plate configured to mount the rotatable vane to an exterior of an aircraft; and a housing extending from the base plate opposite the rotatable vane and configured to extend within an interior of the aircraft;

wherein the fault detector comprises a processor and computer-readable memory encoded with instructions that, when executed by the processor, cause the fault detector to output the indication of the rotational fault condition based on the difference between the first sensed pressure from the first pressure sensing port and the second sensed pressure from the second pressure sensing port.

14. A method comprising:

generating a differential pressure signal indicative of a difference between a first sensed pressure from a first pressure sensing port disposed in a first surface of a rotatable angle of attack vane and a second sensed pressure from a second pressure sensing port disposed in a second surface of the rotatable angle of attack vane that is opposite the first surface;

outputting, by a fault detector executing on at least one processor of an angle of attack sensing system, an indication of a rotational fault condition in response to determining, by the fault detector, that the differential pressure signal exceeds a threshold deviation from a baseline pressure difference.

15. The method of claim 14, wherein generating the differential pressure signal comprises measuring, by a differential pressure sensor, the difference between the first sensed pressure and the second sensed pressure.

16. The method of claim 14, wherein generating the differential pressure signal comprises:

measuring, by a first pressure sensor, the first sensed pressure from the first pressure sensing port;

measuring, by a second pressure sensor, the second sensed pressure from the second pressure sensing port; and generating the differential pressure signal as a difference between the first sensed pressure and the second sensed pressure.

17. The method of claim 14, wherein the baseline pressure difference corresponds to alignment of the rotatable angle of attack vane with a direction of air flowing over the rotatable angle of attack vane in a direction from a leading edge to a trailing edge of the rotatable angle of attack vane.

18. The method of claim 14,
wherein the rotatable angle of attack vane is configured to freely rotate to align with a direction of air flowing over the rotatable angle of attack vane in a direction from a leading edge to a trailing edge of the rotatable angle of attack vane.

19. The method of claim 14,
wherein outputting the indication of the rotational fault condition comprises outputting the indication of the rotational fault condition in response to determining that the differential pressure signal exceeds the threshold deviation from the baseline pressure difference for a threshold period of time.

20. An angle of attack sensing system comprising:
a rotatable vane comprising a first surface and a second surface opposite the first surface;
a first pressure sensing port disposed in the first surface;
a second pressure sensing port disposed in the second surface;
a rotatable shaft extending axially from the rotatable vane;
a vane position sensor disposed proximate the rotatable shaft and configured to sense a rotational position of the rotatable shaft and output a rotational position signal of the rotatable vane based on the sensed rotational position of the rotatable shaft;
at least one pressure sensor mounted on the rotatable shaft;
a first pneumatic connection between the first pressure sensing port and the at least one pressure sensor, the first pneumatic connection comprising a first pressure chamber disposed within the rotatable shaft;
a second pneumatic connection between the second pressure sensing port and the at least one pressure sensor, the second pneumatic connection being pneumatically isolated from the first pneumatic connection and comprising a second pressure chamber disposed within the rotatable shaft; and
a fault detector configured to output an indication of a rotational fault condition based on a difference between a first sensed pressure from the first pressure sensing port and a second sensed pressure from the second pressure sensing port.

* * * * *